United States Patent
Smeeton et al.

(10) Patent No.: US 11,966,046 B2
(45) Date of Patent: Apr. 23, 2024

(54) COMPACT HEAD-UP DISPLAY AND WAVEGUIDE THEREFOR

(71) Applicant: Envisics Ltd, Milton Keynes (GB)

(72) Inventors: Timothy Smeeton, Milton Keynes (GB); Neil Collings, Milton Keynes (GB); Yiren Xia, Milton Keynes (GB); Rakesh Maharjan, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 18/062,157

(22) Filed: Dec. 6, 2022

(65) Prior Publication Data

US 2023/0194860 A1   Jun. 22, 2023

(30) Foreign Application Priority Data

Dec. 21, 2021 (GB) ..................................... 2118627

(51) Int. Cl.
 *G02B 27/00* (2006.01)
 *F21V 8/00* (2006.01)
 *G02B 27/01* (2006.01)

(52) U.S. Cl.
 CPC ....... *G02B 27/0081* (2013.01); *G02B 6/0035* (2013.01); *G02B 27/0101* (2013.01)

(58) Field of Classification Search
 CPC ............ G02B 27/0081; G02B 27/0101; G02B 27/0172; G02B 27/0103; G02B 27/01; G02B 27/017; G02B 27/0176; G02B 27/0179; G02B 6/0035; G02B 6/0055; G02B 6/003; G02B 6/0033; G02B 6/0038; G02B 6/0045; G02B 6/005; G02B 6/0051;
 (Continued)

(56) References Cited

U.S. PATENT DOCUMENTS

2009/0161088 A1  6/2009  Hansen et al.
2012/0044572 A1  2/2012  Simmonds et al.
(Continued)

FOREIGN PATENT DOCUMENTS

| EP | 2 244 114 A1 | 10/2010 |
|---|---|---|
| WO | 2021/110746 A1 | 6/2021 |
| WO | WO 2021/110746 A1 | 6/2021 |

OTHER PUBLICATIONS

Extended European Search Report issued in application EP 22 213 441.3 dated May 19, 2023 (5 pages).
(Continued)

*Primary Examiner* — Travis S Fissel
(74) *Attorney, Agent, or Firm* — Akerman LLP

(57) ABSTRACT

A waveguide arranged as a pupil expander for a display system is disclosed. The waveguide comprises a pair of opposing surfaces arranged to guide a light field therebetween by internal reflection. An input port is arranged to receive light from the display system. A reflective element is arranged to internally reflect the light field. The input port and reflective element are formed on a second surface of the pair of opposing surfaces. An output port is formed on a first surface of the pair of opposing surfaces by a transmissive-reflective element configured to divide the light field at each internal reflection therefrom such that a plurality of replicas of the light field are transmitted out of the waveguide through the output port.

15 Claims, 8 Drawing Sheets

(58) Field of Classification Search
CPC .......... G02B 6/0065; G02B 2027/0123; G02B 2027/0187; G02B 5/32; G02B 17/0856; H04N 5/7491
USPC ...... 359/629–633, 13–14; 345/7–9; 348/115; 349/11
See application file for complete search history.

(56) References Cited

U.S. PATENT DOCUMENTS

| | | | |
|---|---|---|---|
| 2012/0200937 A1 | 8/2012 | Totani et al. | |
| 2013/0003185 A1* | 1/2013 | Fattal .................. | G02B 6/2804 359/629 |
| 2016/0041387 A1* | 2/2016 | Valera .................. | G02B 6/0055 385/36 |

OTHER PUBLICATIONS

Notification of Grant for UK App. GB 2118627.5, dated Sep. 19, 2023 (2 pages).
Search Report issued in GB 2118627.5 dated May 17, 2022 (4 pages).

* cited by examiner

COMPACT HEAD-UP DISPLAY AND WAVEGUIDE THEREFOR

CROSS-REFERENCE TO RELATED APPLICATIONS

This application claims priority under 35 U.S.C. § 119 to UK Patent Application GB 2118627.5, titled "Compact Head-Up Display and Waveguide Therefor," filed on Dec. 21, 2021, and currently pending. The entire contents of GB 2118627.5 are incorporated by reference herein for all purposes.

FIELD

The present disclosure relates to pupil expansion or replication, in particular, for a diffracted light field comprising diverging ray bundles. More specifically, the present disclosure relates a display system comprising a waveguide pupil expander and to a method of pupil expansion using a waveguide. Some embodiments relate to two-dimensional pupil expansion, using first and second waveguide pupil expanders. Some embodiments relate to picture generating unit and a head-up display, for example an automotive head-up display (HUD).

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD".

SUMMARY

Aspects of the present disclosure are defined in the appended independent claims.

Broadly, the present disclosure relates to image projection. It relates to a method of image projection and an image projector which comprises a display device. The present disclosure also relates to a projection system comprising the image projector and a viewing system, in which the image projector projects or relays light from the display device to the viewing system. The present disclosure is equally applicable to a monocular and binocular viewing system. The viewing system may comprise a viewer's eye or eyes. The viewing system comprises an optical element having optical power (e.g., lens/es of the human eye) and a viewing plane (e.g., retina of the human eye/s). The projector may be referred to as a 'light engine'. The display device and the image formed (or perceived) using the display device are spatially separated from one another. The image is formed, or perceived by a viewer, on a display plane. In some embodiments, the image is a virtual image and the display plane may be referred to as a virtual image plane. In other embodiments, the image is a real image formed by holographic reconstruction and the image is projected or relayed to the viewing plane. The image is formed by illuminating a diffractive pattern (e.g., hologram) displayed on the display device.

The display device comprises pixels. The pixels of the display device may display a diffractive pattern or structure that diffracts light. The diffracted light may form an image at a plane spatially separated from the display device. In accordance with well-understood optics, the magnitude of the maximum diffraction angle is determined by the size of the pixels and other factors such as the wavelength of the light.

In embodiments, the display device is a spatial light modulator such as liquid crystal on silicon ("LCOS") spatial light modulator (SLM). Light propagates over a range of diffraction angles (for example, from zero to the maximum diffractive angle) from the LCOS, towards a viewing entity/system such as a camera or an eye. In some embodiments, magnification techniques may be used to increase the range of available diffraction angles beyond the conventional maximum diffraction angle of an LCOS.

In some examples, an image (formed from the displayed diffractive pattern/hologram) is propagated to the eyes. For example, spatially modulated light of an intermediate holographic reconstruction/image formed either in free space or on a screen or other light receiving surface between the display device and the viewer, may be propagated to the viewer.

In some other examples, the (light of a) diffractive pattern/hologram itself is propagated to the eyes. For example, spatially modulated light of the hologram (that has not yet been fully transformed to a holographic reconstruction, i.e. image)—that may be informally said to be "encoded" with/by the hologram—is propagated directly to the viewer's eyes. A real or virtual image may be perceived by the viewer. In these embodiments, there is no intermediate holographic reconstruction/image formed between the display device and the viewer. It is sometimes said that, in these embodiments, the lens of the eye performs a hologram-to-image conversion or transform. The projection system, or light engine, may be configured so that the viewer effectively looks directly at the display device.

Reference is made herein to a "light field" which is a "complex light field". The term "light field" merely indicates a pattern of light having a finite size in at least two orthogonal spatial directions, e.g. x and y. The word "complex" is used herein merely to indicate that the light at each point in the light field may be defined by an amplitude value and a phase value, and may therefore be represented by a complex number or a pair of values. For the purpose of hologram calculation, the complex light field may be a two-dimensional array of complex numbers, wherein the complex numbers define the light intensity and phase at a plurality of discrete locations within the light field.

In accordance with the principles of well-understood optics, the range of angles of light propagating from a display device that can be viewed, by an eye or other viewing entity/system, varies with the distance between the display device and the viewing entity. At a 1 metre viewing distance, for example, only a small range of angles from an LCOS can propagate through an eye's pupil to form an image at the retina for a given eye position. The range of angles of light rays that are propagated from the display device, which can successfully propagate through an eye's pupil to form an image at the retina for a given eye position, determines the portion of the image that is 'visible' to the viewer. In other words, not all parts of the image are visible from any one point on the viewing plane (e.g., any one eye position within a viewing window such as eye-motion box.)

In some embodiments, the image perceived by a viewer is a virtual image that appears upstream of the display device—that is, the viewer perceives the image as being further away from them than the display device. Conceptually, it may therefore be considered that the viewer is looking at a virtual image through an 'display device-sized window', which may be very small, for example 1 cm in diameter, at a relatively large distance, e.g., 1 metre, and the user will be viewing the display device-sized window via the pupil(s) of their eye(s), which can also be very small. Accordingly, the field of view becomes small and the specific angular range that can be seen depends heavily on the eye position, at any given time.

A pupil expander addresses the problem of how to increase the range of angles of light rays that are propagated from the display device that can successfully propagate through an eye's pupil to form an image. The display device is generally (in relative terms) small and the projection distance is (in relative terms) large. In some embodiments, the projection distance is at least one—such as, at least two—orders of magnitude greater than the diameter, or width, of the entrance pupil and/or aperture of the display device (i.e., size of the array of pixels). Embodiments of the present disclosure relate to a configuration in which a hologram of an image is propagated to the human eye rather than the image itself. In other words, the light received by the viewer is modulated according to (or encoded with/by) a hologram of the image. However, other embodiments of the present disclosure may relate to configurations in which the image is propagated to the human eye rather than the hologram—for example, by so called indirect view, in which light of a holographic reconstruction or "replay image" formed on a screen (or even in free space) is propagated to the human eye.

Use of a pupil expander increases the viewing area (i.e., user's eye-box) laterally, thus enabling some movement of the eye/s to occur, whilst still enabling the user to see the image. As the skilled person will appreciate, in an imaging system, the viewing area (user's eye box) is the area in which a viewer's eyes can perceive the image. The present disclosure relates to non-infinite virtual image distances—that is, near-field virtual images.

Conventionally, a two-dimensional pupil expander comprises one or more one-dimensional optical waveguides each formed using a pair of opposing reflective surfaces, in which the output light from a surface forms a viewing window—e.g., eye-box or eye motion box—for viewing by the viewer. Light received from the display device (e.g., spatially modulated light from a LCOS) is replicated by the or each waveguide so as to increase the field of view (or viewing area) in at least one dimension. In particular, the waveguide enlarges the viewing window due to the generation of extra rays or "replicas" by division of amplitude of the incident wavefront.

There is disclosed herein a system that forms an image using diffracted light and provides an eye-box size and field of view suitable for real-world application—e.g. in the automotive industry by way of a head-up display. The diffracted light is light forming a holographic reconstruction of the image from a diffractive structure—e.g. hologram such as a Fourier or Fresnel hologram. The use of diffraction and a diffractive structure necessitates a display device with a high density of very small pixels (e.g. 1 micrometer)—which, in practice, means a small display device (e.g. 1 cm). The inventors have addressed a problem of how to provide 2D pupil expansion with a diffracted light field (e.g. diffracted light comprising diverging (not collimated) ray bundles).

In aspects, the display system comprises a display device—such as a pixelated display device, for example a spatial light modulator (SLM) or Liquid Crystal on Silicon (LCoS) SLM—which is arranged to provide or form the diffracted light. In such aspects, the aperture of the spatial light modulator (SLM) is a limiting aperture of the system. That is, the aperture of the spatial light modulator—more specifically, the size of the area delimiting the array of light modulating pixels comprised within the SLM—determines the size (e.g. spatial extent) of the light ray bundle that can exit the system. In accordance with this disclosure, it is stated that the exit pupil of the system is expanded to reflect that the exit pupil of the system (that is limited by the small display device having a pixel size for light diffraction) is made larger or bigger or greater in spatial extent by the use of at least one pupil expander.

The diffracted light field may be said to have "a light field size", defined in a direction substantially orthogonal to a propagation direction of the light field. In some embodiments, the light is diverging such that the light field size increases with propagation distance. In other embodiments, the light is collimated such that the light field size does not change with propagation distance.

In some embodiments, the diffracted light field is spatially-modulated in accordance with a hologram. In other words, in such aspects, the diffractive light field comprises a "holographic light field". The hologram may be displayed on a pixelated display device. The hologram may be a computer-generated hologram (CGH). It may be a Fourier hologram or a Fresnel hologram or a point-cloud hologram or any other suitable type of hologram. The hologram may, optionally, be calculated so as to form channels of hologram light, with each channel corresponding to a different respective portion of an image that is intended to be viewed (or perceived, if it is a virtual image) by the viewer. The pixelated display device may be configured to display a plurality of different holograms, in succession or in sequence. Each of the aspects and embodiments disclosed herein may be applied to the display of multiple holograms.

The output port of the first waveguide pupil expander may be coupled to an input port of a second waveguide pupil expander. The second waveguide pupil expander may be arranged to guide the diffracted light field—including some of, preferably most of, preferably all of, the replicas of the light field that are output by the first waveguide pupil expander—from its input port to a respective output port by internal reflection between a third pair of parallel surfaces of the second waveguide pupil expander.

The first waveguide pupil expander may be arranged to provide pupil expansion, or replication, in a first direction and the second waveguide pupil expander may be arranged to provide pupil expansion, or replication, in a second, different direction. The second direction may be substantially orthogonal to the first direction. The second waveguide pupil expander may be arranged to preserve the pupil expansion that the first waveguide pupil expander has provided in the first direction and to expand (or, replicate) some of, preferably most of, preferably all of, the replicas that it receives from the first waveguide pupil expander in the second, different direction. The second waveguide pupil expander may be arranged to receive the light field directly or indirectly from the first waveguide pupil expander. One or more other elements may be provided along the propagation path of the light field between the first and second waveguide pupil expanders.

In some embodiments, the pair of opposing surfaces of the first waveguide pupil expander are elongate or elongated surfaces, being relatively long along a first dimension and relatively short along a second dimension, for example being relatively short along each of two other dimensions, with each dimension being substantially orthogonal to each of the respective others. The process of reflection/transmission of the light between/from the first pair of surfaces is arranged to cause the light to propagate within the first waveguide pupil expander, with the general direction of light propagation, and thus pupil expansion, being in the direction along which the first waveguide pupil expander is relatively long (i.e., in its "elongate" direction).

Thus, the first waveguide pupil expander may be substantially elongated (e.g. rod shaped). The second waveguide pupil expander may be substantially planar (e.g. rectangular-shaped). The elongated shape of the first waveguide pupil expander may be defined by a length along a first dimension, corresponding to the first direction (i.e. direction of pupil expansion). The planar, or rectangular, shape of the second waveguide pupil expander may be defined by a length along a first dimension and a width, or breadth, along a second dimension substantially orthogonal to the first dimension. A size, or length, of the first waveguide pupil expander along its first dimension make correspond to the length or width of the second waveguide pupil expander along its first or second dimension, respectively. A first surface of the pair of parallel surfaces of the second waveguide pupil expander, which comprises its input port, may be shaped, sized, and/or located so as to correspond to an area defined by the output port on the first surface of the pair of parallel surfaces on the first waveguide pupil expander, such that the second waveguide pupil expander is arranged to receive each of the replicas output by the first waveguide pupil expander.

The first and second waveguide pupil expander may collectively provide pupil expansion in a first direction and in a second direction perpendicular to the first direction, optionally, wherein a plane containing the first and second directions is substantially parallel to a plane of the second waveguide pupil expander. In other words, the first and second dimensions that respectively define the length and breadth of the second waveguide pupil expander may be parallel to the first and second directions, respectively, (or to the second and first directions, respectively) in which the waveguide pupil expanders provide pupil expansion. The combination of the first waveguide pupil expander and the second waveguide pupil expander may be generally referred to as being a "pupil expander".

It may be said that the expansion/replication provided by the first and second waveguide expanders has the effect of expanding an exit pupil of the display system in each of two directions. An area defined by the expanded exit pupil may, in turn, define an expanded eye-box area, from which the viewer can receive light of the input diffracted light field. The eye-box area may be said to be located on, or to define, a viewing plane.

The two directions in which the exit pupil is expanded may be coplanar with, or parallel to, the first and second directions in which the first and second waveguide pupil expanders provide replication/expansion. Alternatively, in arrangements that comprise other elements such as an optical combiner, for example the windscreen (or, windshield) of a vehicle, the exit pupil may be regarded as being an exit pupil from that other element, such as from the windscreen. In such arrangements, the exit pupil may be non-coplanar and non-parallel with the first and second directions in which the first and second waveguide pupil expanders provide replication/expansion. For example, the exit pupil may be substantially perpendicular to the first and second directions in which the first and second waveguide pupil expanders provide replication/expansion.

Accordingly, in some embodiments, the viewing plane (e.g. eye-box area) may be non-coplanar or non-parallel to the first and second directions in which the first and second waveguide pupil expanders provide replication/expansion. For example, a viewing plane may be substantially perpendicular to the first and second directions in which the first and second waveguide pupil expanders provide replication/expansion.

In order to provide suitable launch conditions to achieve internal reflection within the first and second waveguide pupil expanders, an elongate dimension of the first waveguide pupil expander may be tilted relative to the first and second dimensions of the second waveguide pupil expander.

The display device may have an active or display area having a first dimension that may be less than 10 cms such as less than 5 cms or less than 2 cms. The propagation distance between the display device and viewing system may be greater than 1 m such as greater than 1.5 m or greater than 2 m. The optical propagation distance within the waveguide may be up to 2 m such as up to 1.5 m or up to 1 m. The method may be capable of receiving an image and determining a corresponding hologram of sufficient quality in less than 20 ms such as less than 15 ms or less than 10 ms.

In some embodiments—described only by way of example of a diffracted or holographic light field in accordance with this disclosure—a hologram is configured to route light into a plurality of channels, each channel corresponding to a different part (i.e. sub-area) of an image. The hologram may be represented, such as displayed, on a display device such as a spatial light modulator. When displayed on an appropriate display device, the hologram may spatially modulate light transformable by a viewing system into the image. The channels formed by the diffractive structure (comprising the hologram) are referred to herein as "hologram channels" merely to reflect that they are channels of light encoded by the hologram with image information. It may be said that the light of each channel is in the hologram domain rather than the image or spatial domain. In some embodiments, the hologram is a Fourier or Fourier transform hologram and the hologram domain is therefore the Fourier or frequency domain. The hologram may equally be a Fresnel or Fresnel transform hologram. The hologram is described herein as routing light into a plurality of hologram channels merely to reflect that the image that can be reconstructed from the hologram has a finite size and can be arbitrarily divided into a plurality of image sub-areas, wherein each hologram channel would correspond to each image sub-area. Importantly, the hologram of this example is characterised by how it distributes the image content when illuminated. Specifically, the hologram divides the image content by angle. That is, each point on the image is associated with a unique light ray angle in the spatially modulated light formed by the hologram when illuminated—at least, a unique pair of angles because the hologram is two-dimensional. For the avoidance of doubt, this hologram behaviour is not conventional. The spatially modulated light formed by this special type of hologram, when illuminated, may be arbitrarily divided into a plurality of hologram channels, wherein each hologram channel is defined by a range of light ray angles (in two-dimensions). It will be understood from the foregoing that any hologram channel (i.e. sub-range of light ray angles) that may be considered in the spatially modulated light will be associated with a respective part or sub-area of the image. That is, all the information needed to reconstruct that part or sub-area of the image is contained within a sub-range of angles of the spatially modulated light formed from the hologram of the image. When the spatially modulated light is observed as a whole, there is not necessarily any evidence of a plurality of discrete light channels. However, in some arrangements, a plurality of spatially separated hologram channels is formed by intentionally leaving areas of the target image, from which the hologram is calculated, blank or empty (i.e., no image content is present).

Nevertheless, the hologram may still be identified. For example, if only a continuous part or sub-area of the spatially modulated light formed by the hologram is reconstructed, only a sub-area of the image should be visible. If a different, continuous part or sub-area of the spatially modulated light is reconstructed, a different sub-area of the image should be visible. A further identifying feature of this type of hologram is that the shape of the cross-sectional area of any hologram channel substantially corresponds to (i.e. is substantially the same as) the shape of the entrance pupil although the size may be different—at least, at the correct plane for which the hologram was calculated. Each light/hologram channel propagates from the hologram at a different angle or range of angles. Whilst these are example ways of characterising or identifying this type of hologram, other ways may be used. In summary, the (special type of) hologram disclosed herein is characterised and identifiable by how the image content is distributed within light encoded by the hologram. Again, for the avoidance of any doubt, reference herein to a hologram configured to direct light or angularly-divide an image into a plurality of hologram channels is made by way of example only and the present disclosure is equally applicable to pupil expansion of any type of holographic light field or even any type of diffractive or diffracted light field.

Broadly, a system is disclosed herein that provides pupil expansion for an input light field, wherein the input light field is a diffracted or holographic light field. In some embodiments, the size of the input light field changes with propagation distance, such that the bundle of light rays forms a diverging (or converging) beam. In this case, the light rays of the bundle of light rays have different light ray angles/directions. As discussed above, pupil expansion (which may also be referred to as "image replication" or "replication" or "pupil replication") enables the size of the area at/from which a viewer can see an image (or, can receive light of a hologram, which the viewer's eye forms an image) to be increased, by creating one or more replicas of an input light ray (or ray bundle). The pupil expansion can be provided in one or more dimensions. For example, two-dimensional pupil expansion can be provided, with each dimension being substantially orthogonal to the respective other.

The system can be provided in a compact and streamlined physical form. This enables the system to be suitable for a broad range of real-world applications, including those for which space is limited and real-estate value is high. For example, it may be implemented in a head-up display (HUD) such as a vehicle or automotive HUD.

In accordance with the present disclosure, pupil expansion is provided for diffracted or diffractive light, which may comprise diverging ray bundles. The diffractive or diffracted light may be output by a display device such as a pixelated display device such as a spatial light modulator (SLM) arranged to display a diffractive structure such as a hologram. The diffracted light field may be defined by a "light cone". Thus, the size of the diffracted light field (as defined on a two-dimensional plane) increases with propagation distance from the corresponding diffractive structure (i.e. display device).

The spatial light modulator may be arranged to display a hologram (or a diffractive pattern comprising a hologram). The diffracted or diverging light may comprise light encoded with/by the hologram, as opposed to being light of an image or of a holographic reconstruction. In such embodiments, it can therefore be said that the pupil expander replicates the hologram or forms at least one replica of the hologram, to convey that the light delivered to the viewer is spatially modulated in accordance with a hologram of an image, not the image itself. That is, a diffracted light field is propagated to the viewer.

In some embodiments, two one-dimensional waveguide pupil expanders are provided, each one-dimensional waveguide pupil expander being arranged to effectively increase the size of the exit pupil of the system by forming a plurality of replicas or copies of the exit pupil (or light of the exit pupil) of the spatial light modulator. The exit pupil may be understood to be the physical area from which light is output by the system. It may also be said that each waveguide pupil expander is arranged to expand the size of the exit pupil of the system. It may also be said that each waveguide pupil expander is arranged to expand/increase the size of the eye box within which a viewer's eye can be located, in order to see/receive light that is output by the system.

In the present disclosure, the term "replica" is merely used to reflect that spatially modulated light is divided such that a complex light field is directed along a plurality of different optical paths. The word "replica" is used to refer to each occurrence or instance of the complex light field after a replication event—such as a partial reflection-transmission by a pupil expander. Each replica travels along a different optical path. Some embodiments of the present disclosure relate to propagation of light that is encoded with a hologram, not an image—i.e., light that is spatially modulated with a hologram of an image, not the image itself. The person skilled in the art of holography will appreciate that the complex light field associated with propagation of light encoded with a hologram will change with propagation distance. Use herein of the term "replica" is independent of propagation distance and so the two branches or paths of light associated with a replication event are still referred to as "replicas" of each other even if the branches are a different length, such that the complex light field has evolved differently along each path. That is, two complex light fields are still considered "replicas" in accordance with this disclosure even if they are associated with different propagation distances—providing they have arisen from the same replication event or series of replication events.

A "diffracted light field" or "diffractive light field" in accordance with this disclosure is a light field formed by diffraction. A diffracted light field may be formed by illuminating a corresponding diffractive pattern. In accordance with this disclosure, an example of a diffractive pattern is a hologram and an example of a diffracted light field is a holographic light field or a light field forming a holographic reconstruction of an image. The holographic light field forms a (holographic) reconstruction of an image on a replay plane. The holographic light field that propagates from the hologram to the replay plane may be said to comprise light encoded with/by the hologram or light in the hologram domain. A diffracted light field is characterized by a diffraction angle determined by the smallest feature size of the diffractive structure and the wavelength of the light (of the diffracted light field). In accordance with this disclosure, it may also be said that a "diffracted light field" is a light field that forms a reconstruction on a plane spatially separated from the corresponding diffractive structure. An optical system is disclosed herein for propagating a diffracted light field from a diffractive structure to a viewer (e.g. from a display device to a viewing system). The diffracted light field may form an image.

The optical system comprises a waveguide, for example a waveguide pupil expander as described herein. The waveguide comprises an input port, and output port and a pair of opposing surfaces. The pair of opposing surfaces is arranged to guide a diffracted light field therebetween by internal reflection. The input port is arranged to directly or indirectly receive light from a display system. The output port is formed by a first transmissive-reflective element of a first surface of the pair of opposing surfaces. The first transmissive-reflective element is such that the diffracted light field is divided at each internal reflection and a plurality of replicas of the diffracted light field are transmitted out of the waveguide through the output port. The input port comprises an optically transparent window in a (highly) reflective element of a second surface of the pair of opposing surfaces. The transparent window is arranged to receive at least a portion of the light field from a display device. The (highly) reflective element comprises a relatively-short metal layer formed on the second surface of the waveguide and a dielectric stack at least partially disposed on the metal layer. Thus, the metal layer of the reflective element forms a step at an edge (or boundary) with the transparent window. The dielectric stack is offset with respect to the edge in a direction away from the transparent window.

The light field comprises a plurality of single colour components. The waveguide is configured to waveguide and replicate each of the single colour components. The terms "achromatic" and "chromatic" are used herein with respect to the different wavelengths of the plurality of different single colour component. For example, the term achromatic reflectivity is used herein to indicate that the reflectivity is substantially equal at each wavelength of the plurality of different wavelengths. Likewise, the term chromatic reflectivity is used herein to indicate that the reflectivity is not substantially equal at each wavelength of the plurality of different wavelengths. The person skilled in the art of optics will appreciate that the reflectivity of metal is chromatic—that is, the reflectivity of metal is a strong function of wavelength. The person skilled in the art of optics will be familiar with how dielectric stacks comprising a plurality of different dielectric layers may be designed to provide a desired reflectivity (e.g. achromatic reflectivity) and no further details are therefore given herein. For the avoidance of doubt, the plurality of dielectric layers of the dielectric stack collectively (that is, as a whole or combination) provide the achromatic reflectivity, as per this disclosure.

The expression "at least partially disposed on the metal layer" is used to indicate that a first part of the dielectric stack is disposed on the metal layer and a second part of the dielectric stack is disposed directly on the second surface of the waveguide (i.e. no intermediate layer), wherein the second part is further from the input port than the first part. The second part of the dielectric stack begins when the metal layer ends.

References herein to the "length" of a waveguide refers to the lateral dimension parallel to the direction of propagation of light within the waveguide (i.e. direction of "waveguiding"), which is also the direction (or dimension) of pupil expansion by the waveguide.

In embodiments of the waveguide, the metal layer does not extend the full length of the reflective element. For example, the length of the metal layer is less than 20 mm or 10 mm such as less than 5 mm or less than 2 mm.

In embodiments, a first part of the dielectric stack is disposed on the metal layer to form the step and a second part of the dielectric stack is disposed directly on the second surface of the waveguide. The length of the second part of the dielectric stack may be greater than that of the first part.

In implementations, the metal layer has/exhibits chromatic reflectivity and the dielectric stack has/exhibits achromatic reflectivity, and/or the reflectivity of the dielectric stack is greater than that of the metal layer—at least at the wavelength or wavelengths of the waveguided light.

In some embodiments, the edge formed by the metal layer adjacent the input port is sharper (i.e. larger gradient—ideally the edge is perpendicular (at 90°) to the second surface of the waveguide on which the metal layer is formed) than a second edge formed at the step by the dielectric stack adjacent the input port. That is, the transition between the metal layer and the input port is clearly defined and does not vary over a distance along the length of the second surface of the waveguide (as with an edge that is inclined at an angle (less than 90°) to the second surface of the waveguide).

Typically, the transmissivity of the transmissive-reflective element increases with distance from the input port, in order to compensate for the division of light (some reflected/some transmitted) at each bounce—so the replicas are the same brightness.

In some implementations, the light field guided therebetween by the pair of opposing surfaces of the waveguide is a diffractive light field. For example, the diffractive light field may be a holographic light field. In some embodiments, the light is diverging. A diverging light field may be required in applications where a virtual image is observed by a viewing system at a finite virtual image distance—as opposed to at infinity.

There is provided a display system comprising the waveguide. The display system may comprise a spatial light modulator arranged to display a hologram. The light field incident on the waveguide may be spatially modulated in accordance with the hologram. The display system may comprise a display device having a pixel area defining the exit pupil of the display system that is expanded by the waveguide. The waveguide may form a first one-dimensional pupil expander of a pair of waveguide pupil expanders arranged to expand the pupil of the display system in a first direction and second, perpendicular direction, respectively.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
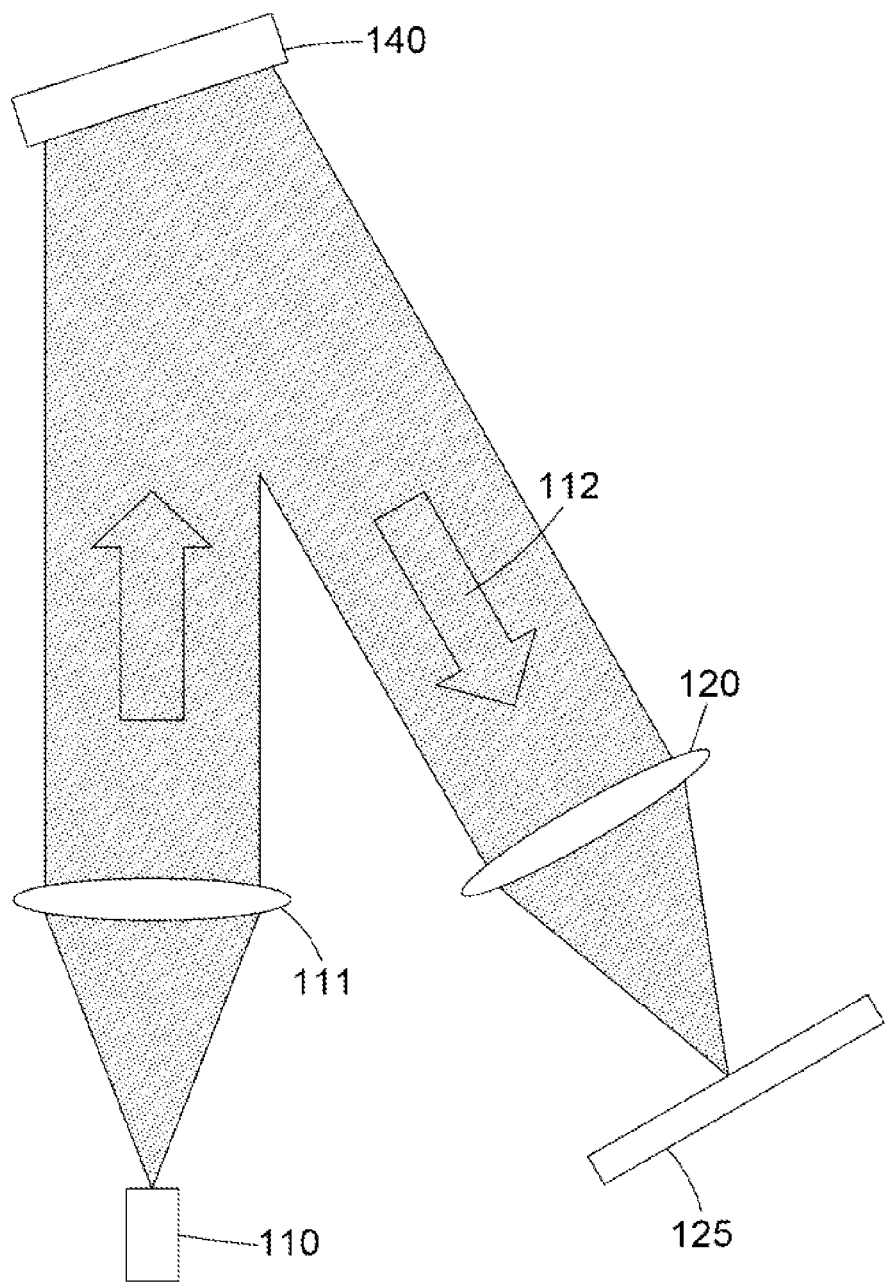
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms. Embodiments relate to Fourier holography and Gerchberg-Saxton type algorithms by way of example only. The present disclosure is equally applicable to Fresnel holography and Fresnel holograms which may be calculated by a similar method. In some embodiments, the hologram is a phase or phase-only hologram. However, the present disclosure is also applicable to holograms calculated by other techniques such as those based on point cloud methods. British patent application GB 2112213.0 filed 26 Aug. 2021, incorporated herein by reference, discloses example hologram calculation methods that may be combined with the present disclosure. In particular, the earlier patent application describes methods for calculating a (special) type of hologram, described below with reference to FIGS. 2 and 3, that angularly divides/channels the image content.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Light Modulation

The display system comprises a display device defining the exit pupil of the display system. The display device is a spatial light modulator. The spatial light modulation may be a phase modulator. The display device may be a liquid crystal on silicon, "LCOS", spatial light modulator (SLM) as well known in the art. A LCOS SLM comprises a plurality of pixels, such as an array of quadrilateral shaped LC pixels. The pixels may be addressed or encoded with a diffractive pattern comprising a hologram. It may be said that the LCOS SLM is arranged "display" a hologram. The LCOS SLM is arranged to be illuminated with light, and to output spatially modulated light in accordance with the hologram. The spatially modulated light output by the LCOS SLM comprises a diffracted or holographic light field as described herein.

Light Channelling

The optical system disclosed herein is applicable to pupil expansion with any diffracted light field. In some embodiments, the diffracted light field is a holographic light field—that is, a complex light field that has been spatially modulated in accordance with a hologram of an image, not the image itself. In some embodiments, the hologram is a special type of hologram that angularly divides/channels the image content. This type of hologram is described further herein merely as an example of a diffracted light field that is compatible with the present disclosure. Other types of hologram may be used in conjunction with the display systems and light engines disclosed herein.

A display system and method are described herebelow, which comprise a waveguide pupil expander. As will be familiar to the skilled reader, the waveguide may be configured as a 'pupil expander' because it can be used to increase the area over (or, within) which the light emitted by a relatively small light emitter—such as a relatively small SLM or other pixelated display device as used in the arrangements described herein—can be viewed by a human viewer or other viewing system that is located at a distance, such as a relatively large distance, away from the light emitter. The waveguide achieves this by increasing the number of transmission points from which the light is output, towards the viewer. As a result, the light may be seen from a plurality of different viewer locations and, for example, the viewer may be able to move their head, and therefore their line of sight, whilst still being able to see the light from the light emitter. Thus, it can be said that the viewer's 'eye-box' or 'eye-motion box' is enlarged, through use of a waveguide pupil expander. This has many useful applications, for example but not limited to head-up displays, for example but not limited to automotive head-up displays.

A display system as described herein may be configured to guide light, such as a diffracted light field, through a waveguide pupil expander in order to provide pupil expansion in at least one dimension, for example in two dimensions. The diffracted light field may comprise light output by a spatial light modulator (SLM), such as an LCOS SLM. For example, that diffracted light field may comprise light that is encoded by a hologram displayed by the SLM. For example, that diffracted light field may comprise light of a holographically reconstructed image, corresponding to a hologram displayed by the SLM. The hologram may comprise a computer-generated hologram (CGH) such as, but not limited to, a point-cloud hologram, a Fresnel hologram, or a Fourier hologram. The hologram may be referred to as being a 'diffractive structure' or a 'modulation pattern'. The SLM or other display device may be arranged to display a diffractive pattern (or, modulation pattern) that comprises the hologram and one or more other elements such as a software lens or diffraction grating, in a manner that will be familiar to the skilled reader.

The hologram may be calculated to provide channelling of the diffracted light field. This is described in detail in each of GB2101666.2, GB2101667.0, and GB2112213.0, all of which are incorporated by reference herein. In general terms, the hologram may be calculated to correspond to an image that is to be holographically reconstructed. That image, to which the hologram corresponds, may be referred to as an 'input image' or a 'target image'. The hologram may be calculated so that, when it is displayed on an SLM and suitably illuminated, it forms a light field (output by the SLM) that comprises a cone of spatially modulated light. In some embodiments the cone comprises a plurality of continuous light channels of spatially modulated light that correspond with respective continuous regions of the image. However, the present disclosure is not limited to a hologram of this type.

Although we refer to a 'hologram' or to a 'computer-generated hologram (CGH)' herein, it will be appreciated that an SLM may be configured to dynamically display a plurality of different holograms in succession or according to a sequence. The systems and methods described herein are applicable to the dynamic display of a plurality of different holograms.

Figure 2:
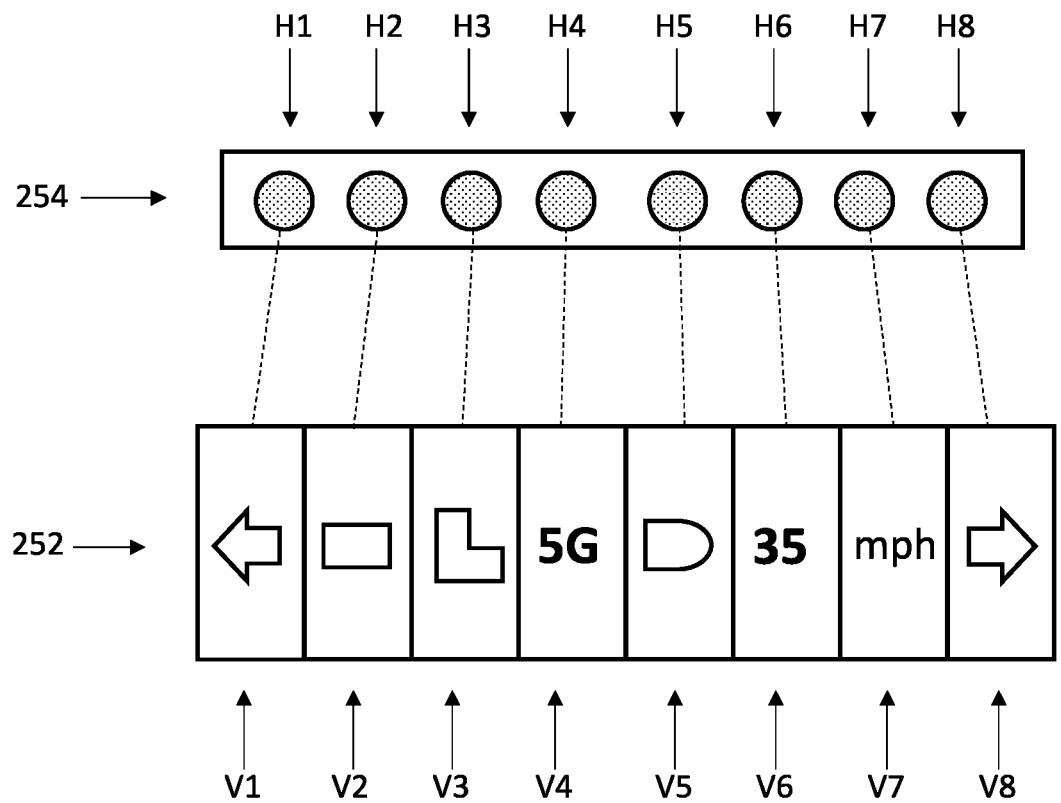
FIG. 2 shows an image comprising a plurality of image areas (bottom) and corresponding hologram comprising a plurality of hologram components (top)
Figure 3:
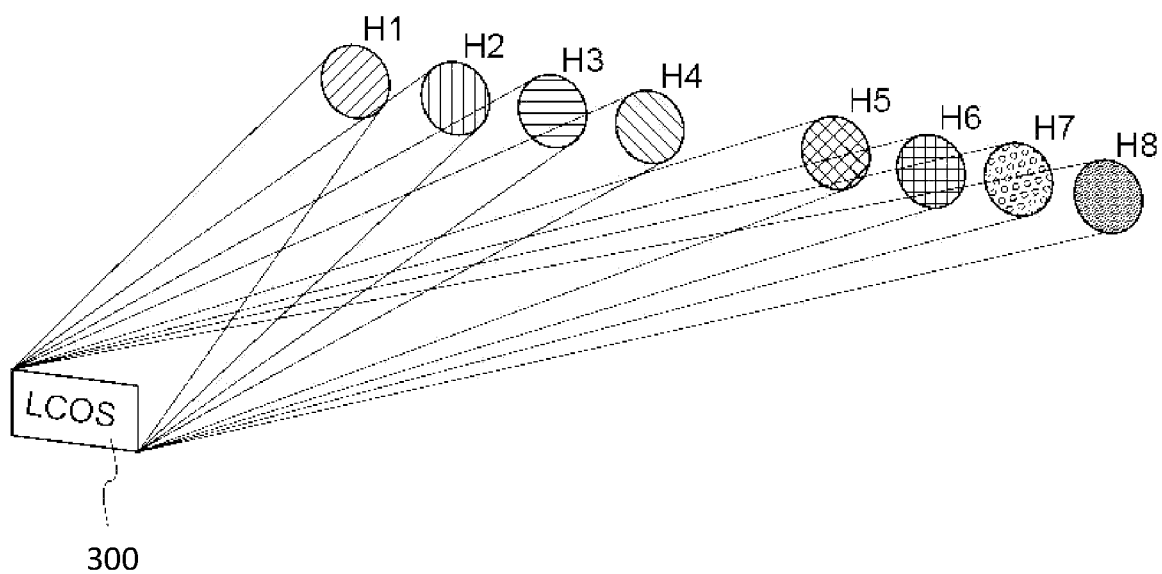
FIG. 3 shows a hologram characterised by the routing or channelling of holographically encoded light into a plurality of discrete hologram channels.

FIGS. 2 and 3 show an example of a type of hologram that may be displayed on a display device such as an SLM, which can be used in conjunction with a pupil expander as disclosed herein. However, this example should not be regarded as limiting with respect to the present disclosure.

FIG. 2 shows an image 252 for projection comprising eight image areas/components, V1 to V8. FIG. 2 shows eight image components by way of example only and the image 252 may be divided into any number of components. FIG. 2 also shows an encoded light pattern 254 (i.e., hologram) that can reconstruct the image 252—e.g., when transformed by the lens of a suitable viewing system. The encoded light pattern 254 comprises first to eighth sub-holograms or components, H1 to H8, corresponding to the first to eighth image components/areas, V1 to V8. FIG. 2 further shows how a hologram may decompose the image content by angle. The hologram may therefore be characterised by the channelling of light that it performs. This is illustrated in FIG. 3. Specifically, the hologram in this example directs light into a plurality of discrete areas. The discrete areas are discs in the example shown but other shapes are envisaged. The size and shape of the optimum disc may, after propagation through the waveguide, be related to the size and shape of the entrance pupil of the viewing system.

Figure 4:
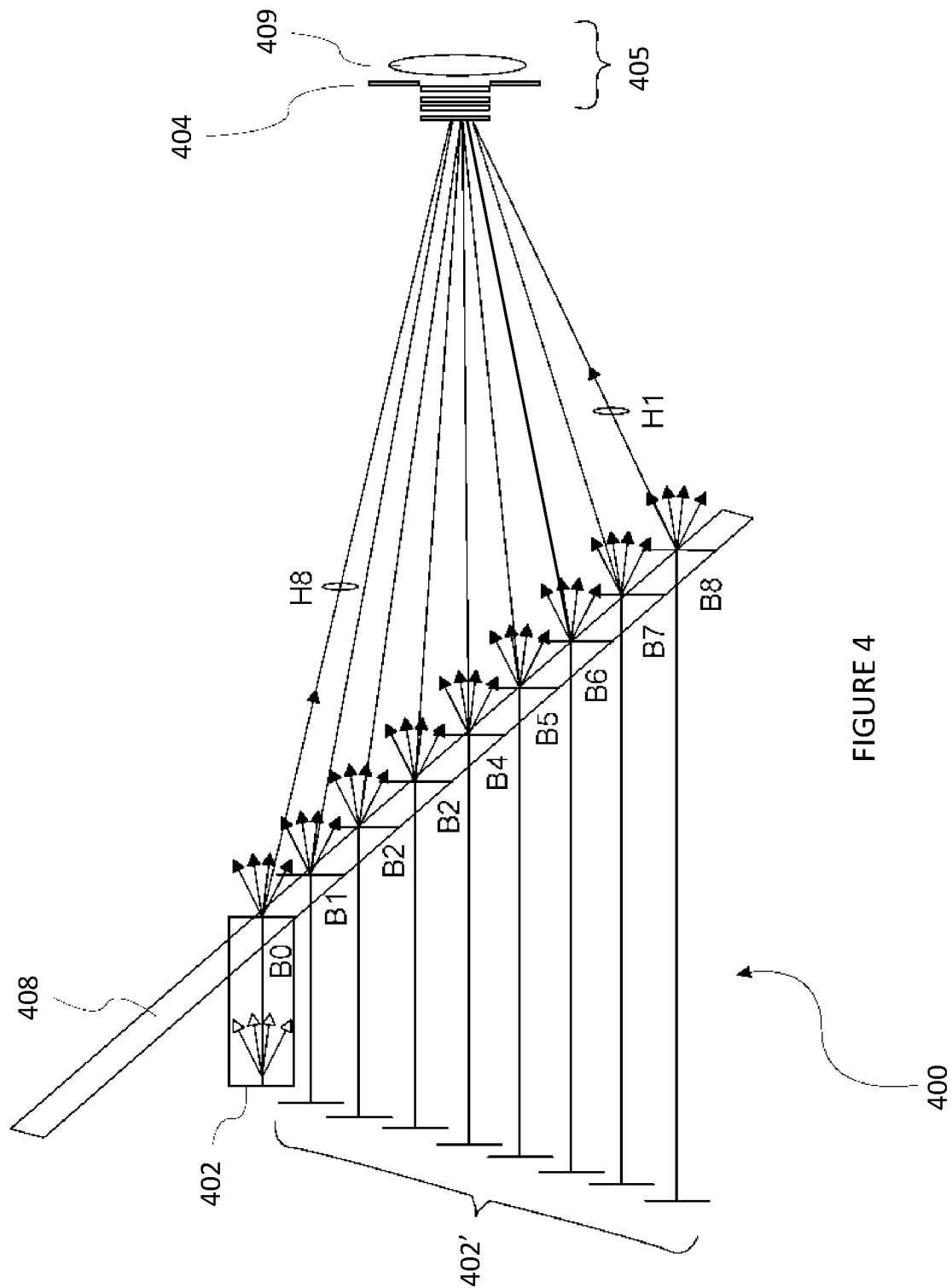
FIG. 4 shows a system arranged to route the light content of each hologram channel of FIG. 3 through a different optical path to the eye.

FIG. 4 shows a system 400, including a display device that displays a hologram that has been calculated as illustrated in FIGS. 2 and 3.

The system 400 comprises a display device, which in this arrangement comprises an LCOS SLM 402 (which may be simply referred to as LCOS 402). The LCOS 402 is arranged to display a modulation pattern (or 'diffractive pattern') comprising the hologram and to project light that has been holographically encoded towards an eye 405 that comprises a pupil that acts as an aperture 404, a lens 409, and a retina (not shown) that acts as a viewing plane. There is a light source (not shown) arranged to illuminate the LCOS 402. The lens 409 of the eye 405 performs a hologram-to-image transformation. The light source may be of any suitable type. For example, it may comprise a laser light source.

The viewing system 400 further comprises a waveguide 408 positioned between the LCOS 402 and the eye 405. The presence of the waveguide 408 enables all angular content from the LCOS 402 to be received by the eye, even at the relatively large projection distance shown. This is because the waveguide 508 acts as a pupil expander, in a manner that is well known and so is described only briefly herein.

In brief, the waveguide 408 shown in FIG. 4 comprises a substantially elongate formation. In this example, the waveguide 408 comprises an optical slab of refractive material, but other types of waveguide are also well known and may be used. The waveguide 408 is located so as to intersect the light cone (i.e., the diffracted light field) that is projected from the LCOS 402, for example at an oblique angle. In this example, the size, location, and position of the waveguide 408 are configured to ensure that light from each of the eight ray bundles, within the light cone, enters the waveguide 408.

Light from the light cone enters the waveguide 408 via its first planar surface (located nearest the LCOS 402) and is guided at least partially along the length of the waveguide 408, before being emitted via its second planar surface, substantially opposite the first surface (located nearest the eye). As will be well understood, the second planar surface is partially reflective, partially transmissive. In other words, when each ray of light travels within the waveguide 408 from the first planar surface and hits the second planar surface, some of the light will be transmitted out of the waveguide 408 and some will be reflected by the second planar surface, back towards the first planar surface. The first planar surface is (highly) reflective, such that all light that hits it, from within the waveguide 408, will be reflected back towards the second planar surface. Therefore, some of the light may simply be refracted between the two planar surfaces of the waveguide 408 before being transmitted, whilst other light may be reflected, and thus may undergo one or more reflections, (or 'bounces') between the planar surfaces of the waveguide 408, before being transmitted.

FIG. 4 shows a total of nine "bounce" points, B0 to B8, along the length of the waveguide 408. Although light relating to all points of the image (V1-V8) as shown in FIG. 2 is transmitted out of the waveguide at each "bounce" from the second planar surface of the waveguide 408, only the light from one angular part of the image (e.g. light of one of V1 to V8) has a trajectory that enables it to reach the eye 405, from each respective "bounce" point, B0 to B8. Moreover, light from a different angular part of the image, V1 to V8, reaches the eye 405 from each respective "bounce" point. Therefore, each angular channel of encoded light reaches the eye only once, from the waveguide 408, in the example of FIG. 4.

The waveguide 408 forms a plurality of replicas of the hologram, at the respective "bounce" points B1 to B8 along its length, corresponding to the direction of pupil expansion. As shown in FIG. 4, the plurality of replicas may be extrapolated back, in a straight line, to a corresponding plurality of replica or virtual display devices 402'. This process corresponds to the step of "unfolding" an optical path within the waveguide, so that a light ray of a replica is extrapolated back to a "virtual surface" without internal reflection within the waveguide. Thus, the light of the expanded exit pupil may be considered to originate from a virtual surface (also called an "extended modulator" herein) comprising the display device 402 and the replica display devices 402'.

The methods and arrangements described above can be implemented in a variety of different applications and viewing systems. For example, they may be implemented in a head-up-display (HUD) or in a head or helmet mounted device (HMD) such as an Augmented Reality (AR) HMD.

Although virtual images, which require the eye to transform received modulated light in order to form a perceived image, have generally been discussed herein, the methods and arrangements described herein can be applied to real images.

Two-Dimensional Pupil Expansion

Whilst the arrangement shown in FIG. 4 includes a single waveguide that provides pupil expansion in one dimension, pupil expansion can be provided in more than one dimension, for example in two dimensions. Moreover, whilst the example in FIG. 4 uses a hologram that has been calculated to create channels of light, each corresponding to different angular content and/or a different portion of an image, the present disclosure and the systems that are described herebelow are not limited to such a hologram type.

Figure 5:
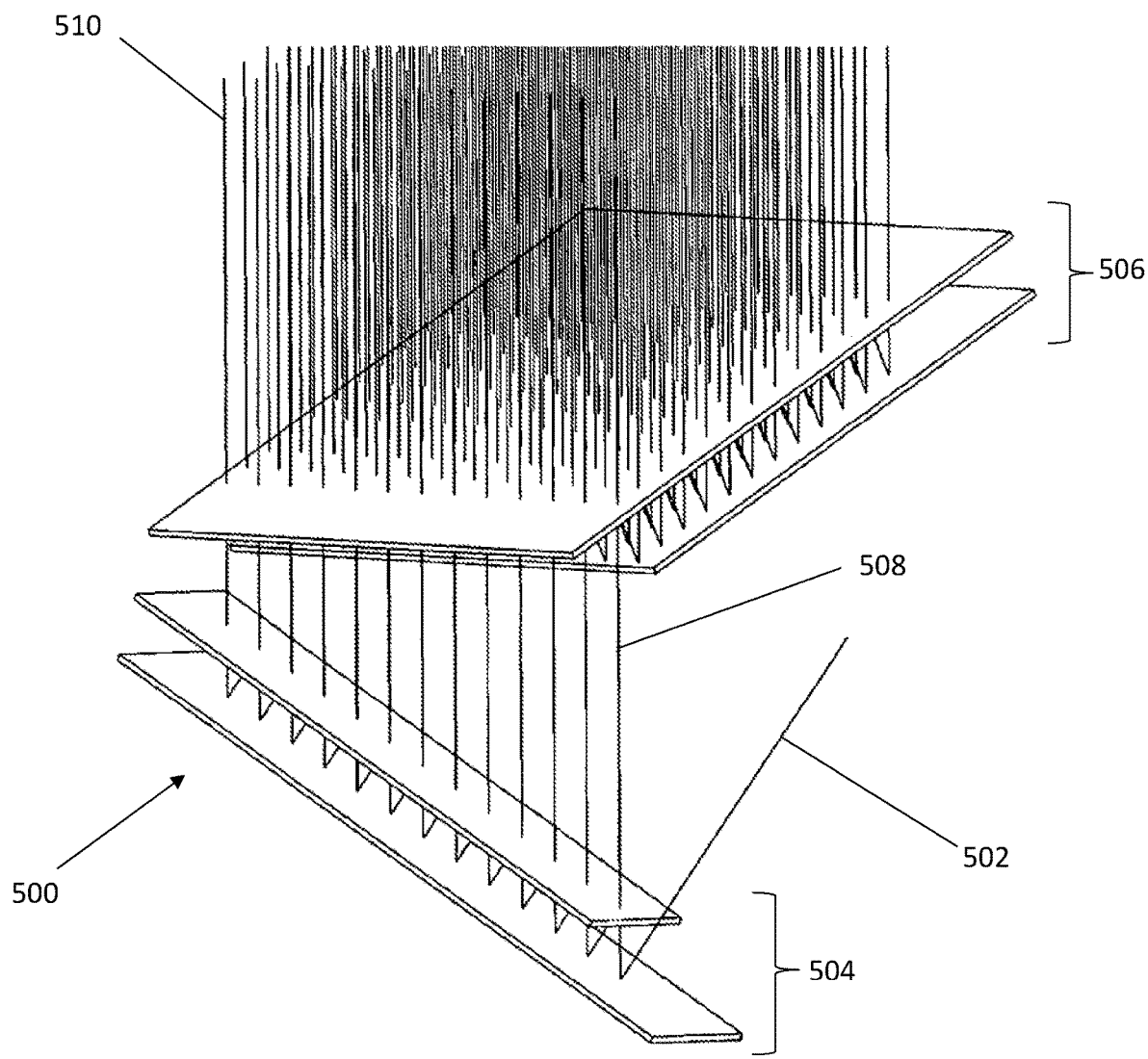
FIG. 5 shows a perspective view of a pair of stacked image replicators arranged for expanding a beam in two dimensions.

FIG. 5 shows a perspective view of a system 500 comprising two replicators, 504, 506 arranged for expanding a light beam 502 in two dimensions.

In the system 500 of FIG. 5, the first replicator 504 comprises a first pair of surfaces, stacked parallel to one another, and arranged to provide replication—or, pupil expansion—in a similar manner to the waveguide 408 of FIG. 4. The first pair of surfaces are similarly (in some cases, identically) sized and shaped to one another and are substantially elongate in one direction. The light beam 502 is directed towards an input on the first replicator 504. Due to a process of internal reflection between the two surfaces, and partial transmission of light from each of a plurality of output points on one of the surfaces (the upper surface, as shown in FIG. 5), which will be familiar to the skilled reader, light of the light beam 502 is replicated in a first direction, along the length of the first replicator 504. Thus, a first plurality of replica light beams 508 is emitted from the first replicator 504, towards the second replicator 506.

The second replicator 506 comprises a second pair of surfaces stacked parallel to one another, arranged to receive each of the collimated light beams of the first plurality of light beams 508 and further arranged to provide replication—or, pupil expansion—by expanding each of those light beams in a second direction, substantially orthogonal to the first direction. The first pair of surfaces are similarly (in some cases, identically) sized and shaped to one another and are substantially rectangular. The rectangular shape is implemented for the second replicator in order for it to have length along the first direction, in order to receive the first plurality of light beams 508, and to have length along the second, orthogonal direction, in order to provide replication in that second direction. Due to a process of internal reflection between the two surfaces, and partial transmission of light from each of a plurality of output points on one of the surfaces (the upper surface, as shown in FIG. 5), light of each light beam within the first plurality of light beams 508 is replicated in the second direction. Thus, a second plurality of light beams 510 is emitted from the second replicator 506, wherein the second plurality of light beams 510 comprises replicas of the input light beam 502 along each of the first direction and the second direction. Thus, the second plurality of light beams 510 may be regarded as comprising a two-dimensional grid, or array, of replica light beams.

Thus, it can be said that the first and second replicators 504, 505 of FIG. 5 combine to provide a two-dimensional replicator (or, "two-dimensional pupil expander"). Each of the first and second replicators 504, 505 takes the form of a waveguide pupil expander comprising a pair of opposing surfaces arranged to guide light therebetween by internal reflection, as described herein. The waveguides shown in FIG. 5 each comprise a pair of first and second opposing surfaces arranged substantially parallel to, and spatially separated from, each other (e.g. by air). In other arrangements, the waveguides may comprise so-called "slab waveguides", in which the first and second opposing surfaces are the opposing (major) parallel surfaces of a slab of optically transparent solid material. In this case, the first replicator 504 may comprise an elongate, rod-shaped slab for providing ID pupil expansion in a first direction along the length of the rod, and the second replicator may comprise a planar, rectangular-shaped slab for providing pupil expansion in a second direction orthogonal to the first direction.

Coupling Light Through a Transparent Window in a Reflective Surface

Conventionally, a diffracted light field (e.g. holographic light field) is coupled into a waveguide through an optically transparent window or entrance aperture in the (highly) reflective surface thereof. Ideally, the light field should be launched through the transparent window so that it is located as close to the edge of the entrance aperture with, or adjacent, the (highly) reflective surface. For example, the light rays at the edge of the diffracted light field should substantially abut or touch the edge of the transparent window adjacent the (highly) reflective surface. This is shown in FIG. 6.

Figure 6:
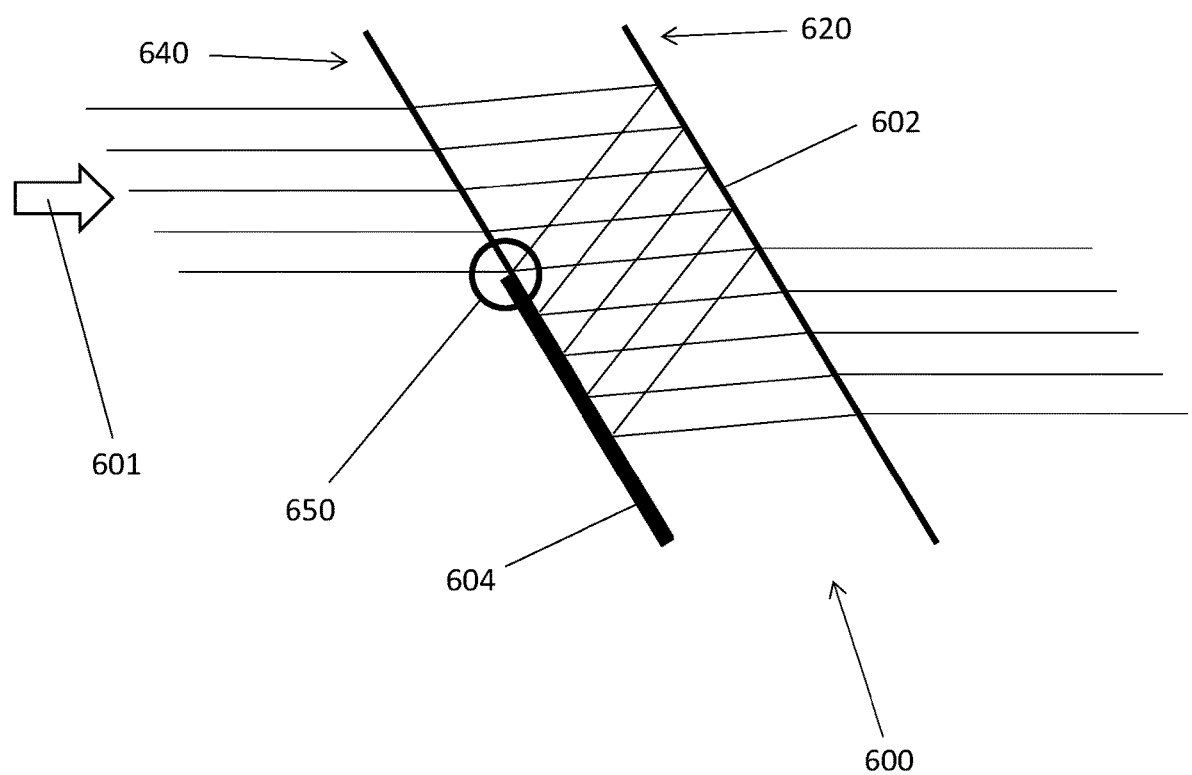
FIG. 6 shows the coupling of parallel rays of a light beam into a waveguide through an optically transparent window in accordance with the prior art.

FIG. 6, and other figures, only show some of the light rays of the light ray bundle for ease of illustration. Whilst FIG. 6, and other figures, show light rays that are parallel to each other for ease of illustration, in some embodiments, the light ray bundle comprises diverging light rays. That is, the light beam received by the waveguide is a diverging light bean. In consequence, the light rays of the light ray bundle have different light ray angles. The concepts disclosed herein are equally effective at improving the in-coupling of collimated light and uncollimated light such as diverging or converging light.

Referring to FIG. 6, a light field 601 comprising a bundle of light rays is incident on an input port of a second surface 640 of a pair of opposed surfaces 620, 640 of waveguide 600. The input port is formed as a transparent window in a continuous, (highly) reflective element 604 formed on the second surface 640. The bundle of light rays is transmitted into the waveguide 600, where the rays are incident at an oblique angle on first surface 620 having a (continuous) partially transmissive/partially reflective element 602 thereon. Thus, the rays are partially internally reflected, and partially transmitted, to form replicas (not all of which are shown for ease of illustration) that exit through the output port formed by first surface 620. The internally reflected rays "bounce" from the first surface 620 at an angle such that they are incident on the (highly) reflective element 604 at the second surface 640. A portion of the internally reflected rays exit through the output port at each "bounce" (this is not shown in FIG. 6 in relation to the first "bounce" for ease of illustration). Thus, the rays of the bundle of light rays of the light field 601 are fully coupled into (i.e. trapped within) the waveguide 600 as shown in FIG. 6.

As shown at 650, an edge of the transparent window is formed at the intersection with the (highly) reflective element 604 on the second surface 640. In order to provide high quality images, the inventors surprisingly found that the form of this edge of the entrance aperture was critical. In some cases, it was found that the edge could cause significant artefacts or defects, such as unwanted lines e.g. dark bands, in the image. These artefacts may appear in each replica. The artefacts are therefore replicated by the waveguide and are caused by physical processes—possibly, prismatic deflection or complex scattering—at the edge of the input port with the highly reflective element. Removal of these artefacts is crucial to achieving acceptable image quality for industrial application. The inventors identified that this edge should be highly abrupt, ideally perfectly changing from high transmission to high reflectivity abruptly (e.g. with the edge substantially perpendicular to the second surface of the waveguide). Furthermore, the inventors found that these image artefacts were much worse with a reflective element comprising dielectric layers, as described below.

In some prior art arrangements, the continuous, (highly) reflective element may comprise a dielectric stack (or dielectric multilayer) with high reflectivity formed on the second surface of the waveguide. In this case, a continuous, (highly) reflective element is typically formed (in a sequence of layers) by vacuum or plasma deposition using a shadow mask to define the position of the edge between the entrance aperture (forming the input port) and the reflective element. A dielectric stack may be preferred to achieve achromatic reflectivity necessary for waveguiding different wavelengths for colour display.

The inventor has found that the use of a dielectric stack provides a high quality, highly reflective (R>99%) element on the second surface of the waveguide. However, the edge of the transparent window at the intersection with the dielectric stack is imperfect—i.e. not highly abrupt, for example the edge may vary in thickness over several 10s of μm. Crucially, as noted above, the transition at the edge of the dielectric stack has been unexpectedly found to create artefacts in the image perceived by the viewer of the system. Whilst imperfect reflectivity can be compensated, the artefacts are a significant barrier in relation to the use of a dielectric stack as the (highly) reflective element on the second surface of the waveguide.

In other prior art arrangements, the continuous, (highly) reflective element may comprise a metallic layer formed on the second surface of the waveguide. In this case a (highly) reflective layer may be formed by vacuum deposition using a shadow mask to define the position of the edge between the entrance aperture (forming the input port) and the (highly) reflective element. A metallic reflector may be less preferrable because the reflectivity will be chromatic, which is incompatible with waveguiding different wavelengths for colour display.

The inventor has found that the use of a metallic layer provides an abrupt edge at the intersection with the transparent window. However, the reflectivity of the metallic layer is lower than achievable with a dielectric stack (e.g. only about 96%). Furthermore, the reflectivity for red, green and blue light by a metallic layer is different due to chromatic nature of metal noted above. In consequence, there is a variation in the relative intensities of red, green and blue light at different positions along the length of the waveguide, due to the multiple internal reflections by the metallic layer with different respective reflectivities. The inventor has found that this results in observable imbalances in the red, green and blue components of the light emitted from the expanded exit pupil of the waveguide—particularly, if the viewer moves to different viewing positions—that is not acceptable for industrial application.

Figure 7A:
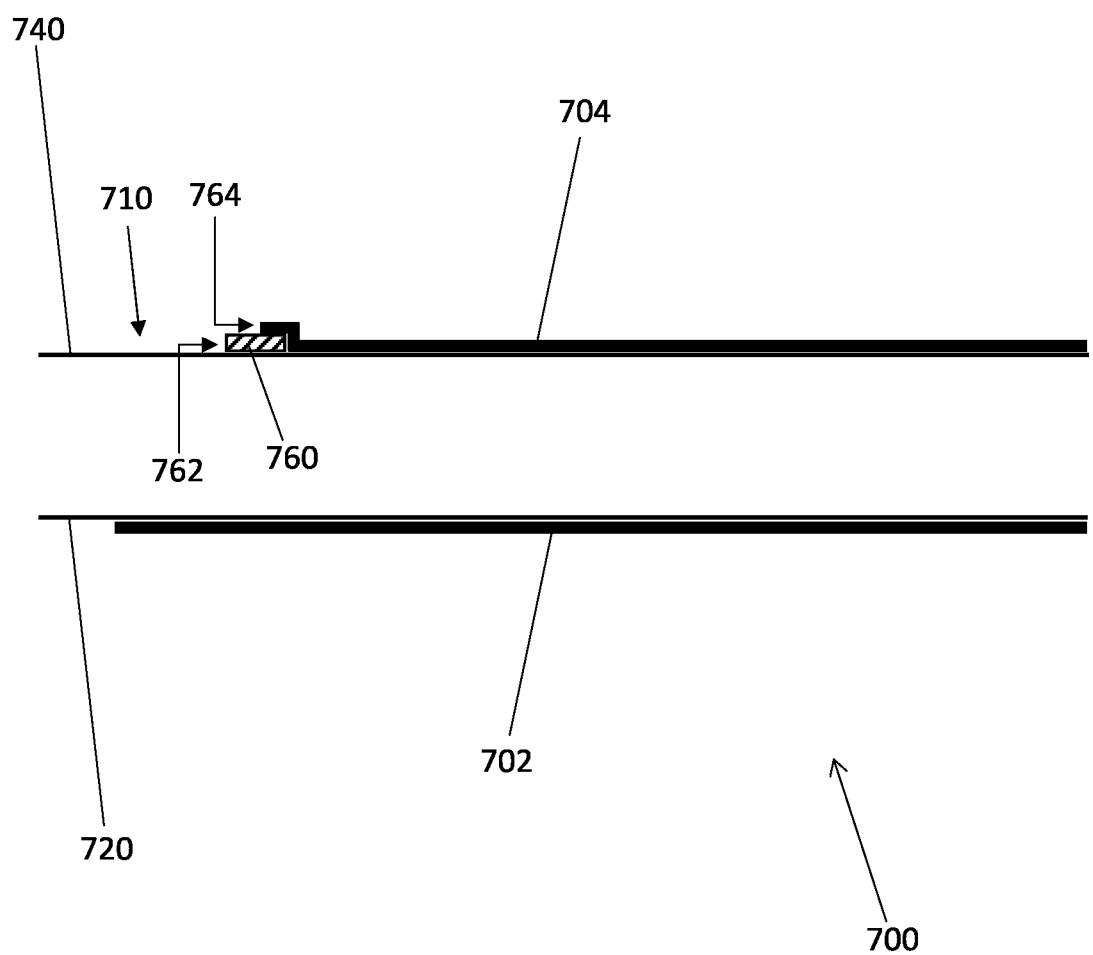
FIG. 7A shows a waveguide in accordance with an embodiment.
Figure 7B:
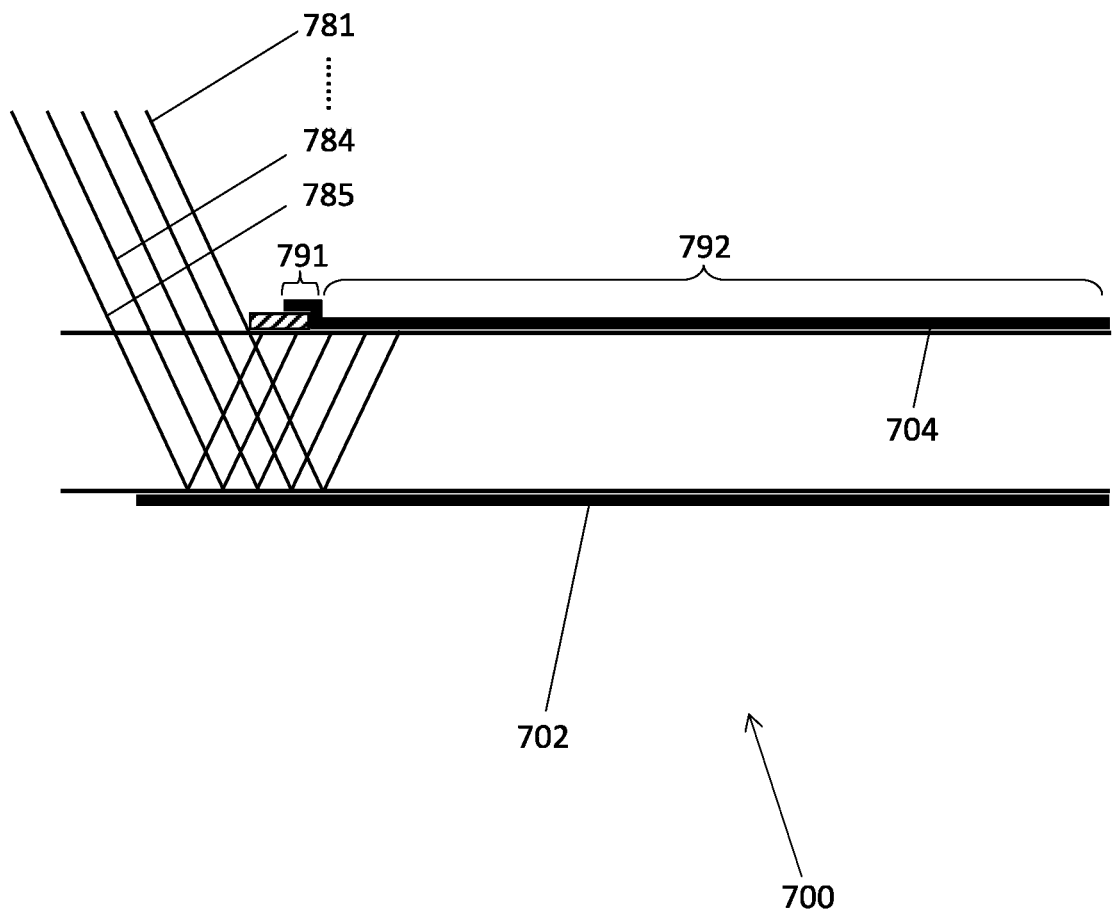
FIG. 7B shows the coupling of parallel rays of a light beam into the waveguide of FIG. 7A.

In consideration of the above findings, the inventor has devised an improved structure for the (highly) reflective element formed on the second surface of the waveguide adjacent the input port. In particular, the (highly) reflective element comprises a "hybrid structure"—comprising a metallic layer and a dielectric multilayer. FIGS. 7A and 7B shows an embodiment of the hybrid structure in accordance with the present disclosure.

Referring to FIGS. 7A and 7B, the waveguide 700 comprises a pair of opposing surfaces 720, 740, arranged to guide light by internal reflection therebetween along the length of the waveguide 700, in particular from a first end to a second end thereof (i.e. from left to right in the drawings). The pair of opposing surfaces 720, 740 are substantially parallel and are separated by an optically transparent material, as described above, for example with reference to FIG. 5. In the case that the waveguide is formed of solid transparent material, the pair of opposing surfaces 720, 740 are formed by opposed major surfaces of the solid transparent material.

A first surface 720 of the pair of opposing surfaces of the waveguide 700 comprises a transmissive-reflective element 702, which is configured to divide the light field at each internal reflection therefrom and to output a series of replicas (not shown) along its length. Thus, the transmissive-reflective element 702 expands the exit pupil (e.g. of the display system providing the light for waveguiding), and forms an output port, of the waveguide 700. A second surface 740 of the pair of opposing surfaces of the waveguide 700 comprises an input port 710 adjacent the first end of the waveguide 700 and a (highly) reflective element for internally reflecting light and extending from the input port 710 to the second end of the waveguide 700. In examples, the reflectivity of the transmissive-reflective element 702 is graded, such that the reflectivity decreases with distance from the input port along the length of the waveguide 700. This can be designed to lead to the formation of replicas of substantially uniform intensity along the length of the waveguide 700. In accordance with the present disclosure, the (highly) reflective element has a hybrid structure as described below. In the illustrated arrangement, the input port 710 is an optically transparent window extending from the first end of the waveguide 700 to an edge 762 adjacent the reflective element, although other forms of entrance aperture for the input port 710 are possible.

The reflective element is formed with a "hybrid structure" comprising a (short) metallic layer 760 and a dielectric stack 704. The dielectric stack 704 comprises at least one dielectric layer. In some embodiments, the dielectric stack 704 comprises at least ten different dielectric layers. The metallic layer 760 is disposed on a portion of the second surface 740 of the waveguide 700 adjacent the input port 710. Thus, the metallic layer 760 defines the boundary of the transparent window forming the input port 710. Since the transparent window is defined by a metallic layer 760, the boundary is an abrupt edge 762 that changes from high transmission to high reflectivity abruptly. It may be said that the abrupt edge 762 is a sharp or clearly defined boundary between the transparent window and the reflective element, at a (precise) linear position along the length of the second surface 740 of the waveguide 700. In particular, the abrupt edge 762 may be substantially perpendicular to the second surface 740 of the waveguide 700 on which the metallic layer 760 is formed. A first part 791 of the dielectric stack 704 is disposed on the metallic layer 760, and a second part 792 of the dielectric stack 704, in which the second part 792 is further away from the transparent window than the first part 791, is disposed on the second surface 740 (e.g. up to the second end) of the waveguide 700. In the illustrated embodiment, the dielectric stack 704 is disposed on only a part of the metallic layer 760, so as to define a "step" comprising a second edge 764 substantially adjacent to the transparent window but offset from abrupt edge 762, as described further below. The thickness of the metal layer 760 may be less than that of the dielectric stack 704.

The metallic layer 760 may be formed on the second surface 740 of the waveguide 700 by vacuum deposition using a shadow mask arranged to define the position, shape and/or size of the portion of second surface 740 on which the metallic layer 760 is formed. The dielectric stack 704 may be formed by vacuum or plasma deposition (in a sequence of layers) using a shadow mask arranged to define the position of the "step", and so the second edge 764, of the dielectric stack 704 over the metallic layer 760.

Thus, in the hybrid structure, the metallic layer 760 does not extend along the entire length of the second surface 740 (i.e. up to the second end) of the waveguide 700. Rather, the metallic layer 760 is relatively short and so forms another abrupt edge, which is spatially separated along the length of the waveguide 700 from the abrupt edge 762 at the boundary with transparent window. A dielectric stack 704 is disposed on the metallic layer 760 and on the remaining portion of the second surface 740 (e.g. up to the second end) of the waveguide 700.

Advantageously, the "step" of the dielectric stack 704 formed over the metallic layer 760 has an imperfect edge 764 adjacent to, and offset in a direction away from, the transparent window. However, this imperfect edge 764 is on top of the metallic layer 760 having an abrupt edge 762. Accordingly, the transparent window of the input port 710 is formed with an abrupt edge 762 at the boundary with the (highly) reflective element on the second surface 740 of the waveguide. Thus, light coupled into the waveguide 700 does not form undesirable artefacts due to the imperfect edge 764, as described further below with reference to FIG. 7B.

Furthermore, the remaining portion of the second surface 740 of the waveguide 700 comprises the second part 792 of dielectric stack 704, which provides high reflectivity that is consistent/non-variable for all wavelengths of light (i.e. achromatic). Thus, the (highly) reflective element does not detrimentally affect the colour balance of red, green and blue light emitted from the expanded exit pupil of the waveguide. Accordingly, a colour image perceived by a viewer at different positions within the eye-box has substantially the same colour balance. The length of the dielectric stack 704 (in the elongate direction of the waveguide) may be much greater than that of the metal layer 760—e.g. at least five or ten times greater.

Referring to FIG. 7B, light rays 781-785 of a light field, such as a (single colour) diffracted or holographic light field as described herein, are incident on input port 710. The light rays 781-785 enter the waveguide 700 through the transparent window in the second surface 740 and are incident on reflective-transmissive element 702 of first surface 720 of the waveguide 700 at an oblique angle (to the surface normal) for total internal reflection. Thus, the light rays are internally reflected by reflective-transmissive element 702 (in a first "bounce") at the same oblique angle (to the surface normal). The light field is aligned with the input port 710 such that a front ray 781 of the light field—furthest from the first end of the waveguide 700—just abuts or touches the abrupt edge 762 formed by the metallic layer 760 of the reflective element. In addition, the light field is incident at an oblique angle such that all light rays 781-785 are coupled into the waveguide 700 by the first internal reflection (first "bounce") at the first surface 720.

As a result of the first internal reflection or "bounce", some of the light rays of the light field closest to the first end of the waveguide 700 (e.g. the illustrated light rays 781, 782) are incident on metallic layer 760 at second surface 740. As described herein, the metallic layer 760 has a relatively low reflectivity that is variable according to wavelength of light (i.e. chromatic). Since a first part 791 of the dielectric stack 704 overlies the metallic layer 760, a proportion of the light transmitted though metallic layer 760—due to the lower reflectivity thereof—may nevertheless be reflected back into the waveguide 700 by overlying, higher reflectivity dielectric stack 704 (e.g. illustrated ray 782). This minimises the adverse effects of the low and chromatic reflectivity of metallic layer 760 described herein, and improves the coupling of these rays 781, 782 into the waveguide 700. However, the other light rays of the light field furthest from the first end of the waveguide 700 (e.g. the illustrated light rays 783, 784 and 785) are incident directly on a second part 792 of the dielectric stack 704, which is formed directly on the second surface 720. As described herein, the dielectric stack 704 has a relatively high reflectivity that is the substantially the same for all wavelengths of light (i.e. achromatic). This results in optimal coupling of these light rays 783, 784, 785 into the waveguide 700.

After the first internal reflection or "bounce" of all of the light rays 781-785, the light field is guided between the transmissive-reflective element 702 on the first surface 720 and the second part 792 of dielectric stack 704 on the second surface 740 of the waveguide 700, and thus with substantially the same high reflectivity for all wavelengths of light.

As the skilled person will appreciate, the length of the (relatively short) metallic layer 760 along the second surface 740 of the waveguide 700, for example as defined by a shadow mask, may be chosen according to application requirements. In some examples, a suitable length between the abrupt edges of the metallic layer 760 is between 0.5 mm and 20 mm. In other examples, the length of the metallic layer 760 may be minimised (e.g. about 1 mm) in order to minimise the influence of the relatively low reflectivity of the metallic layer 760 (e.g. on back ray 785 of the light field shown in FIG. 7B). In further examples, the length of the metallic layer 760 is approximately equal to the dimension of the relayed image of the light field. In this way, light is mostly reflected only once from the metal layer 760 and, subsequently, consistently reflected from the dielectric stack 704, as in the embodiment illustrated in FIGS. 7A and 7B.

As the skilled person will further appreciate, the offset between the abrupt edge 762 formed by metallic layer 760 and the imperfect edge 764 of the "step" formed by the dielectric stack 604 adjacent the transparent window, may also be chosen according to application requirements. For example, the offset may be minimised, in order to minimise the influence of the relatively low reflectivity of the metallic layer 760 (e.g. on back ray 785 of the light field shown in FIG. 7B). Nevertheless, the skilled person will appreciate that an offset between the abrupt edge 762 formed by metallic layer 760 and the imperfect edge 764 formed by the dielectric stack 604 with the transparent window is desirable. In particular, the imperfect edge 764 of the dielectric stack may vary over several 10s of μm rather than transition abruptly (i.e. at a precise linear position), such that a minimum separation (e.g. 10-90 μm) between these edges 762, 764 is required to preserve the abrupt edge at the boundary with the transparent window and thus, inter alia, prevent the formation of artefacts in the image perceived by a viewer.

Additional Features

In embodiments, the holographic reconstruction is colour. In some embodiments, an approach known as spatially-separated colours, "SSC", is used to provide colour holographic reconstruction. In other embodiments, an approach known as frame sequential colour, "FSC", is used.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

Some arrangements describe 2D holographic reconstructions by way of example only. In other arrangements, the holographic reconstruction is a 3D holographic reconstruction. That is, in some arrangements, each computer-generated hologram forms a 3D holographic reconstruction.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A waveguide comprising:
   a pair of opposing surfaces arranged to guide a light field therebetween by internal reflection;
   an input port arranged to receive light from a display system;
   a reflective element arranged to internally reflect the light field, wherein the input port and reflective element are formed on a second surface of the pair of opposing surfaces;
   and
   an output port formed by a transmissive-reflective element configured to divide the light field at each internal reflection therefrom such that a plurality of replicas of the light field are transmitted out of the waveguide through the output port,
   wherein the reflective element comprises a metal layer disposed on the second surface of the waveguide and a dielectric stack at least partially disposed on the metal layer to form a step, in which the metal layer forms an edge with the input port and the dielectric stack is offset with respect to the edge in a direction away from the input port.

2. The waveguide of claim 1, wherein the metal layer does not extend a full length of the reflective element.

3. The waveguide of claim 1, wherein a length of the metal layer is less than 20 mm or 10 mm such as less than 5 mm or less than 2 mm.

4. The waveguide of claim 1, wherein a first part of the dielectric stack is disposed on the metal layer to form the step and a second part of the dielectric stack is disposed directly on the second surface of the waveguide.

5. The waveguide of claim 4, wherein a length of the second part of the dielectric stack is greater than that of the first part.

6. The waveguide of claim 1, wherein the metal layer has chromatic reflectivity and the dielectric stack has achromatic reflectivity.

7. The waveguide of claim 6, wherein the reflectivity of the dielectric stack is greater than that of the metal layer.

8. The waveguide of claim 1, wherein the edge formed by the metal layer adjacent the input port is sharper than a second edge formed at the step by the dielectric stack adjacent the input port.

9. The waveguide of claim 1, wherein the reflectivity of the transmissive-reflective element decreases with distance from the input port.

10. The waveguide of claim 1, wherein the output port is formed on a first surface of the pair of opposing surfaces.

11. The waveguide of claim 1, wherein the light field guided therebetween by the pair of opposing surfaces is a diverging light field.

12. The waveguide of claim 1, wherein one or both of (i) the display system comprises a spatial light modulator arranged to display a hologram and (ii) the light field is spatially modulated in accordance with the hologram.

13. The waveguide of claim 12, wherein the display system comprises a display device having a pixel area defining an exit pupil of the display system that is expanded by the waveguide.

14. A system comprising a waveguide, wherein the waveguide comprises:
a pair of opposing surfaces arranged to guide a light field therebetween by internal reflection;
an input port arranged to receive light from a display system;
a reflective element arranged to internally reflect the light field, wherein the input port and reflective element are formed on a second surface of the pair of opposing surfaces;
and
an output port formed by a transmissive-reflective element configured to divide the light field at each internal reflection therefrom such that a plurality of replicas of the light field are transmitted out of the waveguide through the output port, wherein the reflective element comprises a metal layer disposed on the second surface of the waveguide and a dielectric stack at least partially disposed on the metal layer to form a step, in which the metal layer forms an edge with the input port and the dielectric stack is offset with respect to the edge in a direction away from the input port, and wherein the waveguide comprises a first one-dimensional pupil expander of a pair of waveguide pupil expanders arranged to expand the pupil of the display system in a first direction and second, perpendicular direction, respectively.

15. The system of claim 14, wherein the waveguide has a length longer than its width, wherein the length extends in the first direction and the width extends in the second direction.

* * * * *